(No Model.)
M. H. CHRISTIE.
FLOWER OR PLANT HOLDER.
No. 427,402. Patented May 6, 1890.
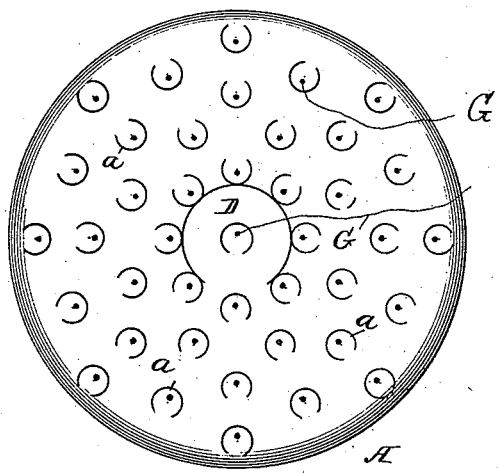
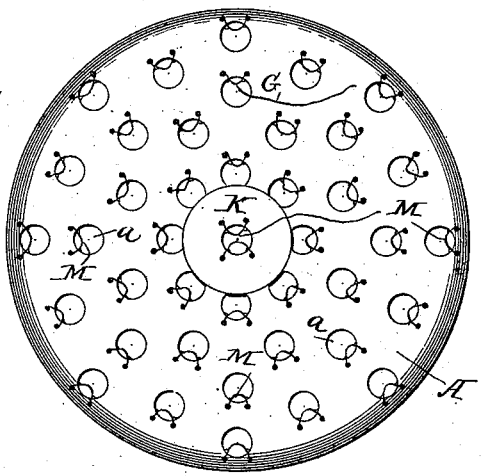
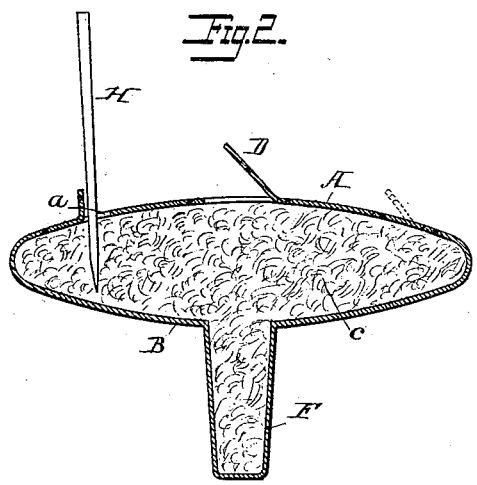
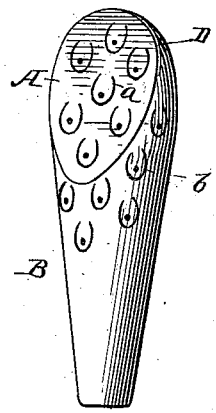
Witnesses
Jno. G. Hinkel Jr.
G. P. Kramer.
Mary H. Christie
Inventor
By her Attorney
J. S. Barker.

UNITED STATES PATENT OFFICE.

MARY H. CHRISTIE, OF TORONTO, ONTARIO, CANADA.

FLOWER OR PLANT HOLDER.

SPECIFICATION forming part of Letters Patent No. 427,402, dated May 6, 1890.

Application filed July 12, 1889. Serial No. 317,295. (No model.)

*To all whom it may concern:*

Be it known that I, MARY HERCUS CHRISTIE, a subject of the Queen of Great Britain, residing at Toronto, in the Province of Ontario and Dominion of Canada, have invented certain new and useful Improvements in Flower and Plant Holders; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has for its object to construct a portable holder for cut flowers or delicate growing plants from some light material impervious to moisture and not liable to breakage; and it consists of a holder shaped to suit the use to which it is to be put and constructed of some light material which is impervious to moisture and adapted to contain moss or other moisture-retaining substance, into which the flower-stems are inserted through holes in the material of which the holder is composed; and it further consists in the details of the construction of such holder and in certain means for holding the flowers in place.

That my invention may be better understood, I have illustrated it in the accompanying drawings, wherein—

Figure 1 is a plan view of a holder containing my invention. Fig. 2 is a central vertical section of same. Fig. 3 is a partial front view of a different form of the holder. Fig. 4 is a plan view of a holder with an arrangement of wire loops for use in a holder constructed of hard material.

In the drawings, A represents the top portion of the holder, and B the bottom, both of which parts are formed of some light impervious material—such as rubber, rubber cloth, gutta-percha, or the like—and may be of a single piece molded or shaped as desired, or of two or more pieces united in a suitable manner. The top is perforated with a number of holes *a* cut in the form of three-fourth circles, so as to leave flaps that can be lifted up. Through these holes formed by lifting up the flaps the flower-stems are passed into the interior of the holder, which I prefer to fill with moss or similar material *c*, adapted to retain moisture, and charcoal, which acts to preserve the flowers and keep them fresh.

To provide for the easy and convenient insertion of the moss, I cut the top A to make a large flap or flaps D in the center, which may be raised, as shown on Fig. 2, when the holder is being filled with moss, but which is closed, as shown in Fig. 1, and held down when the holder is in use. When tender or delicate stems of flowers or plants are to be passed into the filling of the holder, I make use of a pointed stick or pin H, by means of which holes of suitable size for the stems are formed in the moss or filling material. The flaps at the perforations *a* are each furnished with a small hole, through which the florist's wire G is fastened before being passed around flower-stems. This wire G, having been passed around the stems of the flowers in one of the holes at *a*, is then fastened back again to the small hole of the flap and afterward fastened up to the flap of the hole next above, or nearer the center. These flaps, besides forming fastenings for the wires G, also relieve the stems from the pressure or pulling of the wires. The pressure of the wires upon the stems, which might cut them, if tender, is relieved, when found desirable, by wrapping the stems with moss, leaves, paper, or such like.

In Fig. 2 the holder is shown as provided with a handle portion F, by which it may be carried. This handle is formed of the same material as the body portion of the holder, and when in use is filled with moss or other substance. When the holder is intended to be placed upon a flat or shallow receiver or in a basket, this handle F need not be provided.

In Fig. 3 is shown a form of holder for a corsage bouquet, wherein the top A is inclined to the base B thereof, which in this case is extended to form a tubular portion or stem by which the holder may be conveniently attached to the person. I prefer to perforate the base or stem portion, as at *b*, as thereby it is better adapted for an arrangement of flowers which will entirely hide the holder. In this form of holder the flap D for the opening to insert the filling-moss is at the top of the back, and it is secured closed by the florist's wire G being passed through small holes in its edge and the corresponding edge of the opening against which it shuts.

In Fig. 4 is shown the top of the holder when it is made of stiff material. In this case, instead of a flap, the filling-hole in the center is covered with a lid K of similar material to the holder and made so as to be detached while the filling is being done and replaced before the flowers are inserted; also, in this case the holes $a$ for the flowers have no flaps, but are furnished with small wire loops M, secured through two small holes in top of the holder adjacent to the openings $a$. These wire loops are used to secure the florist's wires that hold the flowers in position.

In filling the holders with flowers I commence at the center and work outward and downward. By so doing the flap D or cover K, as the case may be, is securely held down in place and each successive bunch of flowers is secured up toward center and against those already inserted.

By use of my invention cut flowers may be preserved in a fresh condition for a long time, since their stems will be moist and cool, and should it become necessary at any time to renew the moisture in the holder it may be done without the flowers themselves being damped (which is often injurious) by pouring the necessary amount of water into the body of the holder through one, preferably the uppermost, of the holes $a$.

The holder is well adapted for small and delicate growing plants, in which case fertilized moss and charcoal may be used as a filling, which will nourish the plants, and at the same time prevent excessive moisture or sogginess.

When cut flowers are to be shipped, they may be arranged at the place where they are grown in the holders and carried therein, as when so arranged they will keep in a fresh and good condition for a long time, and will be ready for use without having to be rehandled when at their journey's end. The holders used for this purpose, as well as those ordinarily used for bouquets, have their upper perforated surfaces of substantially the same shape as the imperforate bases or bottoms, so that when in use the holders are of a substantially flat shape, enabling them to be readily handled and packed closely in crates for shipment, and, being also preferably collapsible, they may be, when not in use, closely packed for storage or return shipment.

Without limiting myself to the precise construction and arrangement of parts shown, I claim—

1. A portable holder for flowers and plants, formed of light impervious material, having its surface provided with a series of perforations to receive the flower or plant stems, and also provided with means, substantially such as described, situated adjacent to the perforations, to which wires for retaining the flowers or plants in place may be secured, substantially as set forth.

2. A portable holder for flowers and plants, formed of light flexible impervious material, having an imperforate base and a top perforated to receive the flower or plant stems, and also provided with a large hole through which to fill the holder, such hole being closed by a flap integral with the material constituting the top of the holder, substantially as set forth.

3. A holder for flowers or plants, made of soft impervious material perforated to receive the flower or plant stems, which perforations are provided with flaps having holes through which to secure the wires for holding the flowers, substantially as set forth.

In testimony whereof I affix my signature in presence of two witnesses.

MARY H. CHRISTIE.

Witnesses:
WALTER A. GEDDES,
W. H. HODGES.